(12) United States Patent
Appeltans et al.

(10) Patent No.: US 6,806,668 B2
(45) Date of Patent: Oct. 19, 2004

(54) PROTECTION CIRCUIT FOR PROTECTING A SWITCHING DEVICE WITH AN INDUCTIVE LOAD

(75) Inventors: Koen Emiel Jozef Appeltans, Sint-Truiden (BE); Lucas Emiel Elie Vander Voorde, Willebroek (BE)

(73) Assignee: STMicroelectronics NV, Amsterdam (NL)

( * ) Notice: Subject to any disclaimer, the term of this patent is extended or adjusted under 35 U.S.C. 154(b) by 0 days.

(21) Appl. No.: 10/338,817

(22) Filed: Jan. 8, 2003

(65) Prior Publication Data

US 2003/0156363 A1 Aug. 21, 2003

(30) Foreign Application Priority Data

Jan. 8, 2002 (EP) .............................................. 02290029

(51) Int. Cl.[7] .............................. H02P 7/00; H02H 7/08
(52) U.S. Cl. ......................... 318/434; 318/696; 361/23; 361/100
(58) Field of Search ............................. 361/23–34, 63, 361/65, 72, 68; 318/434, 696, 685, 265, 258, 266, 285, 273, 254, 560

(56) References Cited

U.S. PATENT DOCUMENTS

| 5,287,046 A | 2/1994 | Carpenter et al. | |
| 5,428,522 A | * 6/1995 | Millner et al. | ................ 363/63 |
| 6,119,046 A | 9/2000 | Sporer | |

FOREIGN PATENT DOCUMENTS

| DE | 3629186 A1 | 3/1988 |

OTHER PUBLICATIONS

European Search Report date Jun. 24, 2002 for European Patent Application No. 02290029.

* cited by examiner

Primary Examiner—Rajnikant B. Patel
(74) Attorney, Agent, or Firm—Lisa K. Jorgenson; Stephen Bongini; Fleit, Kain, Gibbons, Gutman, Bongini & Bianco P.L.

(57) ABSTRACT

A protection device is provided for protecting a switching device that is able to control a current through an inductive load which is subject to a supply voltage, by switching a first and a second terminal of the inductive load to the respective pole of the supply voltage. The switching device is under control of a switching control device. The switching control device operates based on a predetermined algorithm. The switching device also includes flyback body diodes. The protection device includes measuring means for measuring a voltage level on a terminal of the load, and decision means for making a decision on switching the first terminal of the load if the measured voltage level exceeds the supply voltage. The protection device also includes instructing means for instructing the switching control device based on the decision for switching a first terminal of the load.

21 Claims, 3 Drawing Sheets

PROTECTION CIRCUIT FOR PROTECTING A SWITCHING DEVICE WITH AN INDUCTIVE LOAD

FIELD OF THE INVENTION

The present invention is related to a protection circuit for protecting a switching device that controls a current through an inductive load.

BACKGROUND OF THE INVENTION

A protection device for protecting a switching device arranged to control a current through an inductive load subject to a supply voltage as well as a switching control device are already known in the art, e.g. from an STMicroelectronics product sheet as published on the Internet at http://us.st.com/stonline, which is herein incorporated by reference. Therein, a switching device, called a full bridge switching device with flyback protection consisting of power switches is shown. The switching device is protected with diodes.

The power switches of the switching device switch a supply voltage to a motor in such a way that an inductive load, e.g. a unipolar or bipolar stepper motor, starts running and increases the applied shaft rotation, by connecting a first terminal of this inductive load to a DC supply voltage and a second terminal to ground. The same principle scheme can be applied for DC motors, where the controlled torque can influence the motor speed directly.

It is further to be noticed that the shaft rotation torque applied to such a stepper motor increases as a function of the load current as long as a supply voltage is supplied. This goes on until resistive saturation occurs. To regulate the shaft rotation torque to a certain target level, the load current is regulated by connecting the inductive load (e.g. a motor) to a Direct Current supply voltage and then disconnecting it. This is done periodically, at a high frequency, in order to alternately increase the torque and subsequently decrease it in the same period. It keeps the average torque under control while in switched-mode operation.

This regulation is achieved for instance by reducing the current through the inductive load when an upper current level in the stepper motor is reached. This can be done by controlling the switching device in such way that the second terminal of the load is decoupled from ground, causing the voltage at the second terminal to increase (due to the inductive load) and to exceed the supply voltage, causing a flyback current through a (protection) diode.

The power switches used in the prior art are often discrete components, i.e. not integrated in a chip. In case an integrated circuit is used, intrinsic technological protection is provided or possibly external Schottky diodes are used.

If the switching device is integrated in a chip, the body diodes of the switches can be turned on during the 'flyback phase'. Turning on these intrinsic body diodes creates substrate currents, which can lead to disturbances or "latch-up". In case of latch-up, the circuit can be seen as equivalent to a thyristor structure that cannot be switched off and leads thereby to the destruction of the chip.

One method for avoiding high voltages at the output terminals is presented in U.S. Pat. No. 5,287,046. A method for controlling a chopper driver is disclosed in U.S. Pat. No. 6,119,046. The invention can be used in actuation electronics for stepped motors.

SUMMARY OF THE INVENTION

The present invention aims to provide a protection device for protecting a switching device arranged to control a current through an inductive load subject to a supply voltage.

One embodiment of the present invention provides a protection device for protecting a switching device arranged to control a current through an inductive load subject to a supply voltage, by switching a first and a second terminal of the inductive load to the respective pole of the supply voltage. The switching device is controlled by a switching control device, the switching control device operates based on a predetermined algorithm, and the switching device includes flyback body diodes. The protection device includes measuring means, decision means, and instructing means. The measuring means measures a voltage level on a first terminal of the load, and the decision means makes a decision on switching the first terminal of the load if the measured voltage level exceeds the supply voltage, to counteract the voltage level of the first terminal. The instructing means instructs the switching control device based on the decision on switching the first terminal of the load, to limit the current through a body diode by counteracting the voltage level over the load. In a preferred embodiment, the protection device comprises a comparator.

Another embodiment of the present invention provides a method for protecting a switching device arranged to control a current through an inductive load subject to a supply voltage, by switching a first and a second terminal of the inductive load to the respective pole of the supply voltage. The switching device is controlled by a switching control device, the switching control device operates based on a predetermined algorithm, and the switching device includes flyback body diodes. According to the method, a voltage level on a first terminal of the load is measured, and a decision is made on switching the first terminal of the load if the measured voltage level exceeds the supply voltage, to counteract the voltage level of the first terminal. The switching control device is instructed based on the decision on switching the first terminal of the load, to limit the current through a body diode by counteracting the voltage level over the load. Preferably, the method is implemented by use of a microprocessor of the switching control device.

DETAILED DESCRIPTION OF PREFERRED EMBODIMENTS

Figure 1A:
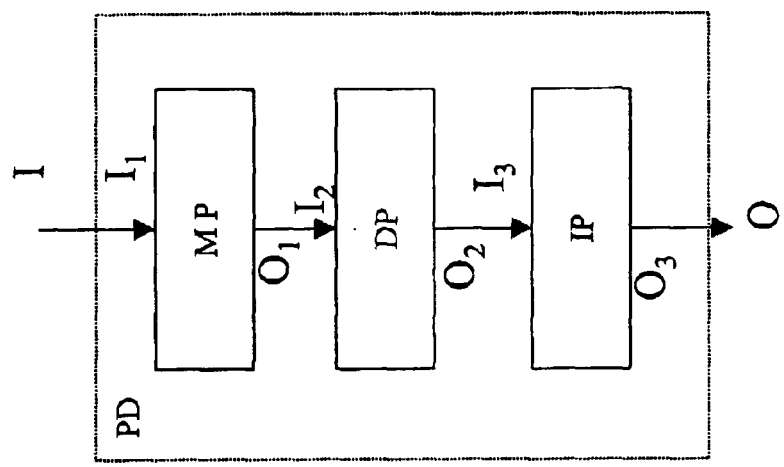
FIG. 1a represents in detail a block scheme of the protection device.

Preferred embodiments of the present invention provide a protection device for protecting a switching device, arranged to control a current through an inductive load subject to a supply voltage, by switching a first and a second terminal of the inductive load to the respective pole of the supply voltage. The switching device is controlled by a switching control device, the switching control device operates based on a predetermined algorithm, and the switching device includes flyback body diodes. The protection device includes measuring means, decision means, and instructing means. The measuring means measures a voltage level on a terminal of the load, and the decision means makes a decision on switching the first terminal of the load if the measured voltage level exceeds the supply voltage, to counteract the voltage level of the first terminal. The instructing means instructs the switching control device based on the decision on switching the first terminal of the load, to limit the current through a body diode by counteracting the voltage level over the load.

In a preferred embodiment the protection device includes a comparator.

The present invention also provides a Packaged Integrated Circuit including a switching device having flyback body diodes. The switching device is arranged to control a current through an inductive load subject to a supply voltage, by switching a first and a second terminal of the inductive load to the respective pole of the supply voltage. The switching device is controlled by a switching control device, and the switching control device operates based on a predetermined algorithm and a protection device for protecting the switching device. The protection device includes measuring means, decision means, and instructing means. The measuring means measures a voltage level on a terminal of the load, and the decision means makes a decision on switching the first terminal of the load if the measured voltage level exceeds the supply voltage, to counteract the voltage level of the first terminal. The instructing means instructs the switching control device based on the decision on switching the first terminal of the load, to limit the current through a body diode by counteracting the voltage level over the load.

In a preferred embodiment, the switching device of the Packaged Integrated Circuit is a bridge switching configuration with flyback protection. The switching device in the Packaged Integrated Circuit can advantageously be an H-bridge switching configuration.

In an alternative embodiment of present invention, the Packaged Integrated Circuit additionally includes the switching control device.

In another preferred embodiment, the predetermined algorithm alternately couples with high speed a terminal of the load to the supply voltage and decouples the terminal of the load from the supply voltage.

In another advantageous embodiment, the switching control device includes an instruction interpretation part arranged to interpret an instruction received from the protection device instructing the switching control device to limit the current through the body diode by counteracting the voltage over the load.

The switching control device can advantageously be arranged to control in a gradual way the switching device to limit the current through the load device.

The present invention further provides a method for protecting a switching device arranged to control a current through an inductive load subject to a supply voltage, by switching a first and a second terminal of the inductive load to the respective pole of the supply voltage, with the switching device being controlled by a switching control device, the switching control device operating based on a predetermined algorithm, and the switching device including flyback body diodes. According to the method, a voltage level on a terminal of the load is measured, and a decision is made on switching the first terminal of the load if the measured voltage level exceeds the supply voltage, to counteract the voltage level of the first terminal. The switching control device is instructed based on the decision on switching the first terminal of the load, to limit the current through a body diode by counteracting the voltage level over the load.

In a preferred embodiment, the method is implemented by use of a microprocessor of the switching control device.

In one particular embodiment, when the terminal is decoupled from the supply voltage, the terminal is coupled to an opposite pole of the supply voltage to counteract the voltage level of the terminal of the load. In an even more specific embodiment, decoupling the terminal of the load from the supply voltage is done gradually.

The following paragraphs detail the protection circuit and related devices according to exemplary embodiments of the present invention. First the main elements of an exemplary network are described with respect to FIG. 1, FIG. 1a and FIG. 2. Then all connections between these network elements are defined. Subsequently all relevant functional means of the network elements are described, followed by a description of all interconnections. In the following paragraph the actual use of the method for session establishment is described.

One element in a description of the invention is an inductive load. The inductive load is here chosen to be a DC motor for driving, for instance, a printer carriage. Further there is a switching device SD for coupling the inductive load M to a voltage supply in such way that the rotation torque applied to the motor M is regulated at a desired level. The switching device SD contains power switches S1, S2, S3, and S4 that are each protected by a body diode D1, D2, D3, and D4. The power switches may be implemented using DMOS, CMOS, bipolar, BICMOS or IBGT transistors.

Additionally there is a switching control device SCD for controlling the switching device SD in such a way that the torque applied to the motor is regulated by controlling the gate or base connector of each of the transistor power switches S1, S2, S3, and S4. This switching control device SCD may be implemented by using a microprocessor having outputs for controlling the transistor power switches S1, S2, S3, and S4.

Further, there is a protection device PD for protecting the switching device SD. The switching device itself is arranged to control a current through an inductive load M. The load M contains a first and a second terminal, each of which are subject to either a supply voltage $V_{DC}$ or to ground $V_{GND}$. The protection device PD contains three parts, as indicated in FIG. 1a. A measuring part MP is adapted to measure a voltage level on, for example, terminal B of the stepper motor M. A decision part DP makes a decision on switching the motor if the voltage at terminal B exceeds the voltage supply $V_{DC}$. Further the protection device includes an instructing part IP for instructing the switching control device SCD based on the decision on switching the DC motor M. In this way the current through the body diodes is limited by counteracting the voltage over the load M.

Figure 1:
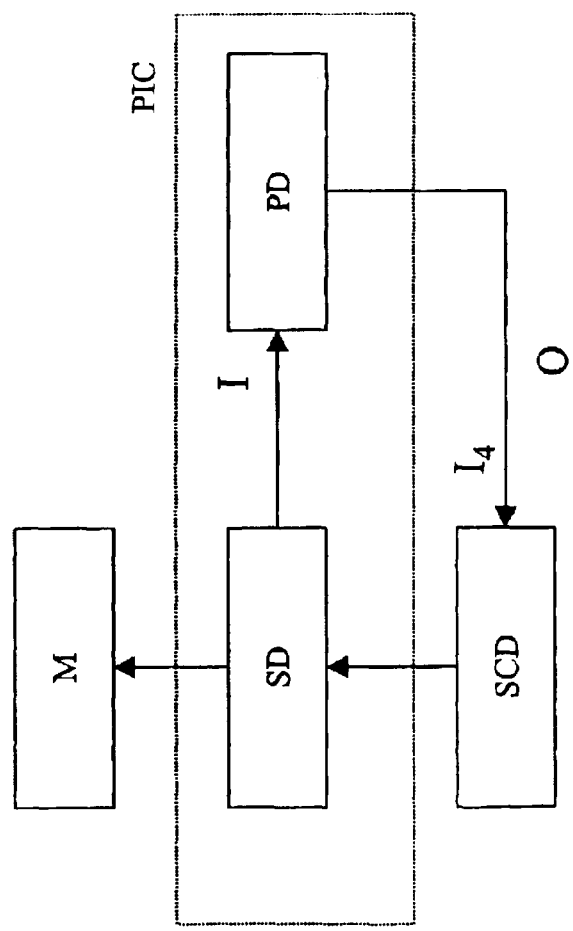
FIG. 1 represents a block diagram of a switching device switching an inductive load under control of a protection device.

In one embodiment, the switching device SD and the protection device PD make up a Packaged Integrated Circuit PIC (see also FIG. 1). In an alternative embodiment, the Packaged Integrated Circuit also includes the switching control device.

The DC motor is coupled to the switching device in such way that the power switches of the switching device SD are able to couple the voltage supply $V_{DC}$ or $V_{GND}$ to the respective connectors A and B of the DC motor.

The switching control device SCD is coupled with its respective outputs to a gate or base connector of each of the transistors implementing the power switches.

Further, the protection device is coupled with an input terminal I to a DC motor terminal. The output O of the protection device PD is coupled to an input $I_4$ of the switching control device SCD.

Input I is an input of the protection device PD and at the same time is an input terminal $I_1$ of the measuring part MP.

The measuring part MP has an output terminal $O_1$, which is coupled to an input terminal $I_2$ of the decision part DP. The decision part in turn is coupled with an output terminal $O_2$ to an input terminal $I_3$ of the instructing part IP. The output terminal $O_3$ of the instructing part is also an output O of the protection device PD.

Figure 2:
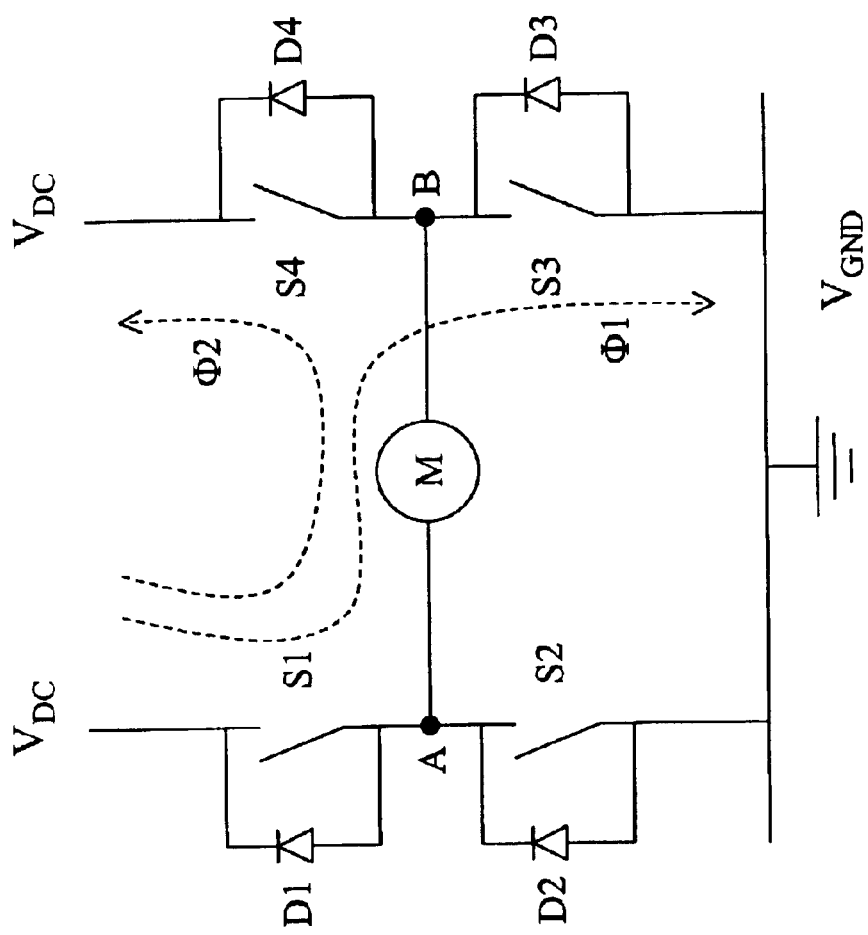
FIG. 2 is the scheme of a full bridge-switching device.

The switching device of FIG. 2 illustratively consists of four power switches S1, S2, S3, and S4 for switching the connector terminals A and B of motor M between the voltage supply $V_{DC}$ and ground $V_{GND}$.

The switching device includes a first power switch S1 to couple the $V_{DC}$ voltage supply pole to connector terminal A of the motor M. Further there is a second power switch S2 coupling the $V_{GND}$ voltage supply pole to connector terminal A of the motor M.

The switching device additionally includes a third power switch S3 coupling the $V_{GND}$ voltage supply pole to connector terminal B of the motor M and a fourth power switch S4 coupling the $V_{DC}$ voltage supply pole to connector terminal B of the motor M.

Each of the power switches is protected by a diode D1, D2, D3, and D4 by coupling each of these diodes in parallel with one of the power switches S1, S2, S3, and S4.

To explain the operation of the present invention it is assumed that power switch S2 is open and power switch S1 is closed, so as to couple the first connector A to the supply voltage $V_{DC}$ pole. It is further assumed that switch S3 is closed, so as to couple connector B to supply voltage $V_{GND}$. In this way the DC motor starts running and increases the applied shaft rotation (Phase 9). The controlled torque can directly influence the motor speed. It is further to be noticed that the shaft rotation torque applied to such a DC motor increases as a function of the load current, as long as a supply voltage is supplied. To bring the shaft rotation torque to a certain target rotation level, the load current is regulated by connecting and disconnecting at a high frequency the DC motor to/from a Direct Current supply voltage. In this way the torque is alternately increased and subsequently decreased in the same period, such that the average torque is kept under control in this switch-mode operation.

Hence, on reaching the predetermined rotation, upper level switch S3 is opened under influence of the control device. The opening of switch S3 may be performed based on a measured rotation speed or even after expiration of a given time interval in which the motor is able to reach a certain rotation speed.

By opening the switch S3, thus decoupling terminal B from ground $V_{GND}$, the voltage at terminal B starts increasing due to the inductive load. It exceeds the supply voltage $V_{DC}$, until the voltage drop over diode D4 reaches a certain value (typically 0.7V for a junction diode) and starts conducting, leading a flyback current through the diode.

To avoid this situation, the measuring part MP of the protection device measures the voltage level on the terminal B of the DC motor and passes the value of the voltage level to the decision part DP. The decision part DP compares the measured voltage level with a stored threshold value, here illustratively being the level of the voltage supply $V_{DC}$. When the measured value reaches the threshold value $V_{DC}$, the decision part decides to counteract the voltage level of terminal B by passing the decision "to close switch S4 and couple terminal B of the DC motor directly to the voltage supply $V_{DC}$" to the instructing part IP in order to trigger the switching control device SCD.

The switching control device SCD then closes switch S4, coupling terminal B of the DC motor directly to the voltage supply $V_{DC}$ (phase 9), and as a consequence limits or avoids the ability of the motor current to flyback or pass via the intrinsic body diodes of the switching devices.

The decoupling of the DC motor terminal from the supply voltage $V_{DC}$ or from ground $V_{GND}$ can also be performed in a gradual way, by closing the switch slowly. In this way the induced voltage is smaller. When the terminal is fully decoupled from the voltage $V_{GND}$, it is coupled to an opposite pole of the supply voltage $V_{DC}$, to counteract the voltage level of the terminal of the load in order to limit the current through a body diode, by counteracting the induced voltage over the motor M.

It is to be noticed that the protection device is preferably implemented using a comparator with a first input coupled to a terminal of the DC motor and with a second input coupled to a reference voltage, illustratively being the voltage supply $V_{DC}$ in this case. The output of this comparator is coupled to an input of the switching control device SCD.

The switching device can advantageously be a bridge switching configuration with flyback protection or an H-bridge switching configuration.

It is further to be noticed that the inductive load might be a DC motor or the phase of a stepper motor. For instance a (bipolar) two-phase stepper motor requires a second full bridge switching device as presented in FIG. 2 in order to control the rotation of such a motor in a step by step way.

Figure 3:
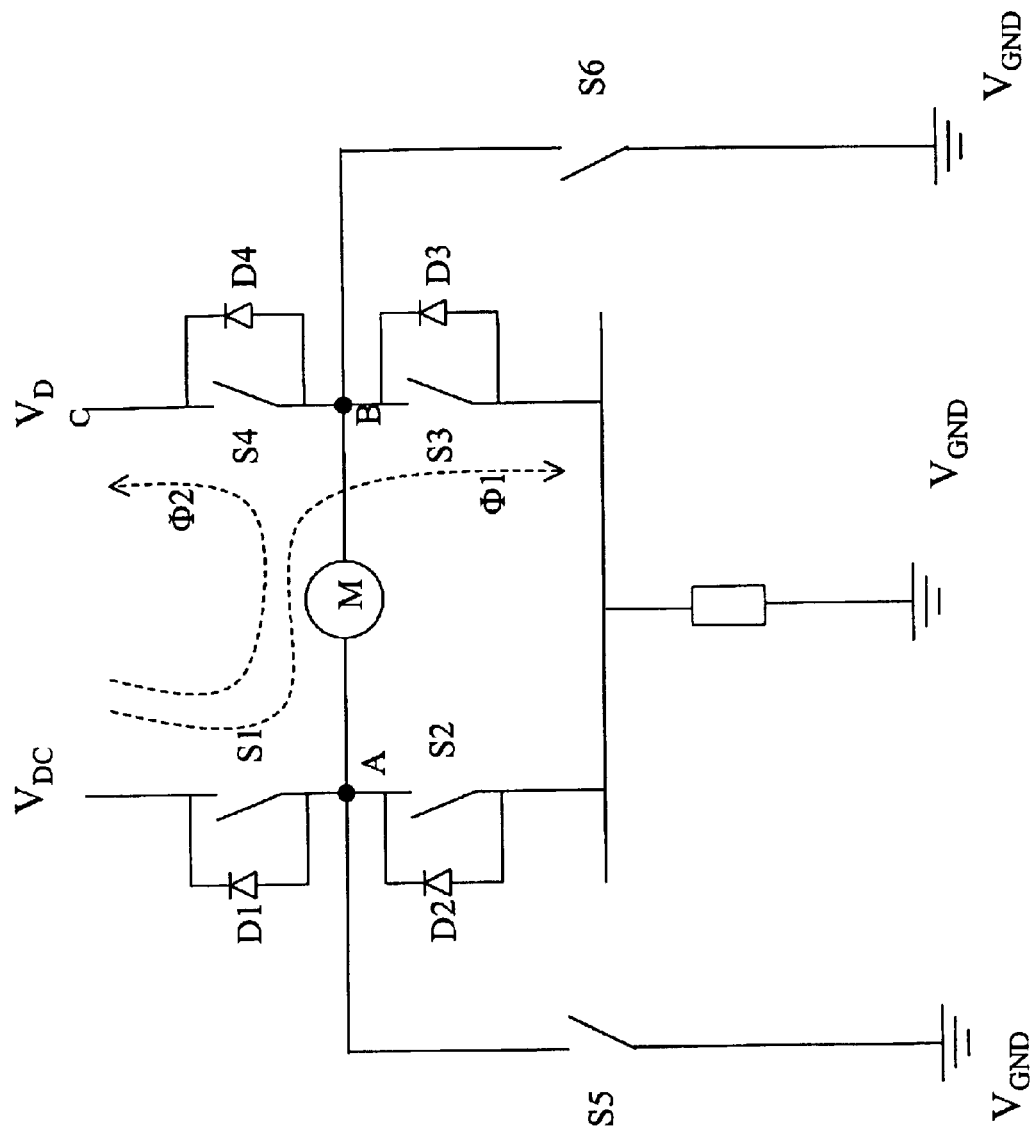
FIG. 3 represents an alternative embodiment of a protected switching device that additionally includes a sense resistor.

In an alternative embodiment of the present invention shown in FIG. 3, a sense-resistor for controlling the position of a stepper motor is used in series with switches S2 and S3. In this embodiment, both switches S2 and S3 are protected using switches S5 and S6, which are coupled between the terminals A and B of the load, respectively, i.e. the DC stepper-motor and ground in case the voltage goes beneath ground voltage.

Hence, due to the presence of the sense resistor (which possibly represents a significant resistance for measurement purposes) switches S2 and S3 are limited in their capability to counteract a dropping voltage on the terminals A or B. In that case, switches S5 and S6 can be used to sufficiently limit the voltage on terminals A or B and consequently to protect switches S2 and S3.

An inductive load can also be present in a switched mode power supply, used in power management or battery management systems. This inductive load can be a physical inductor or a transformer winding in case galvanic separation in the power supply is important.

The embodiments of the present invention are described above partially in terms of functional blocks. From the functional description of these blocks, given above, it will be apparent for a person skilled in the art of designing electronic devices how embodiments of these blocks can be manufactured with well known electronic components.

While the principles of the invention have been described above in connection with specific embodiments, it is to be clearly understood that this description is made only as an example and not as a limitation on the scope of the invention.

What is claimed is:

1. A protection device for protecting a switching device arranged to control a current through an inductive load subject to a supply voltage, by switching a first and a second terminal of the inductive load to the respective pole of the supply voltage, the switching device being controlled by a switching control device, the switching control device operating based on a predetermined algorithm, and the switching device including flyback body diodes, said protection device comprising:

measuring means for measuring a voltage level on a first terminal of the load;

decision means for making a decision on switching the first terminal of the load if the measured voltage level exceeds the supply voltage, to counteract the voltage level of the first terminal; and instructing means for instructing the switching control device based on the decision on switching the first terminal of the load, to limit the current through a body diode by counteracting the voltage level over the load.

2. The protection device according to claim 1, wherein the protection device comprises a comparator having its first input directly connected to the first terminal of the load, its second input coupled to the supply voltage, and its output coupled to an input of the switching control device.

3. A Packaged Integrated Circuit comprising:

a switching device including flyback body diodes, the switching device being arranged to control a current through an inductive load subject to a supply voltage, by switching a first and a second terminal of the inductive load to the respective pole of the supply voltage, and the switching device being controlled by a switching control device; and a protection device for protecting the switching device, wherein the protection device includes:

measuring means for measuring a voltage level on a first terminal of the load;

decision means for making a decision on switching the first terminal of the load if the measured voltage level exceeds the supply voltage, to counteract the voltage level of the first terminal; and instructing means for instructing the switching control device based on the decision on switching the first terminal of the load, to limit the current through a body diode by counteracting the voltage level over the load.

4. The Packaged Integrated Circuit according to claim 3, wherein the switching device is a bridge switching configuration with flyback protection.

5. The Packaged Integrated Circuit according to claim 3, wherein the switching device is an H-bridge switching configuration.

6. The Packaged Integrated Circuit according to claim 3, wherein the switching control device is included in the Packaged Integrated Circuit.

7. The Packaged Integrated Circuit according to claim 6, wherein the switching control device operates based on a predetermined algorithm that, with high speed, alternately couples a terminal of the load to the supply voltage and decouples the terminal of the load from the supply voltage.

8. The Packaged Integrated Circuit according to claim 6, wherein the switching control device includes instruction interpretation means for, when an instruction is received from the protection device instructing the switching control device to limit the current through the body diode by counteracting the voltage over the load, closing a switch of the switching device so as to directly couple the first terminal of the load to the supply voltage through the switch so as to limit the current passing through the body diode of the switching device.

9. The Packaged Integrated Circuit according to claim 6, wherein the switching control device is arranged to control in a gradual way the switching device to limit the current through the load device.

10. An apparatus including at least one motor, and a Packaged Integrated Circuit coupled to the motor, said Packaged Integrated Circuit comprising:

a switching device including flyback body diodes, the switching device being arranged to control a current through an inductive load subject to a supply voltage, by switching a first and a second terminal of the inductive load to the respective pole of the supply voltage, and the switching device being controlled by a switching control device; and a protection device for protecting the switching device, wherein the protection device includes:

measuring means for measuring a voltage level on a first terminal of the load;

decision means for making a decision on switching the first terminal of the load if the measured voltage level exceeds the supply voltage, to counteract the voltage level of the first terminal; and instructing means for instructing the switching control device based on the decision on switching the first terminal of the load, to limit the current through a body diode by counteracting the voltage level over the load.

11. The apparatus according to claim 10, wherein the switching device is a bridge switching configuration with flyback protection.

12. The apparatus according to claim 10, wherein the switching device is an H-bridge switching configuration.

13. The apparatus according to claim 10, wherein the switching control device is included in the Packaged Integrated Circuit.

14. The apparatus according to claim 13, wherein the switching control device is arranged to control in a gradual way the switching device to limit the current through the load device.

15. A method for protecting a switching device arranged to control a current through an inductive load subject to a supply voltage, by switching a first and a second terminal of the inductive load to the respective pole of the supply voltage, the switching device being controlled by a switching control device, the switching control device operating based on a predetermined algorithm, and the switching device comprising flyback body diodes, said method comprising the steps of:

measuring a voltage level on a first terminal of the load;

making a decision on switching the first terminal of the load if the measured voltage level exceeds the supply voltage, to counteract the voltage level of the first terminal; and instructing the switching control device based on the decision on switching the first terminal of the load, to limit the current through a body diode by counteracting the voltage level over the load.

16. The method according to claim 15, implemented by use of a microprocessor of the switching control device.

17. The method according to claim 15, wherein, when one switch of the switching device is open so that the first terminal is decoupled from the supply voltage and the switching control device is instructed to limit the current through the body diode by counteracting the voltage over the load, the one switch is closed so that the first terminal of the load is directly coupled to the supply voltage through the one switch so as to limit the current passing through the body diode of the switching device.

18. The method according to claim 17, wherein decoupling the first terminal of the load from the supply voltage is done gradually.

19. A device for controlling an inductive load, said device comprising:

a switching device including a plurality of switches and a plurality of flyback body diodes, the switching device being coupled to first and second terminals of the inductive load for controlling current through the load by opening and closing the switches so as to selectively couple and decouple the terminals of the load with first and second supply voltages;

a switching control device coupled to the switching device for controlling the opening and closing of the switches of the switching device; and a protection device coupled to the switching control device for, when the switching control device controls two of the switches of the switching device to be open so that the first terminal of the load is decoupled from both the first and second supply voltages and a voltage level on the first terminal of the load exceeds the first supply voltage, instructing the switching control device to close one of the two switches so as to limit the current through a corresponding one of the body diodes of the switching device.

20. The device according to claim 19, wherein when the protection device instructs the switching control device to close one of the two switches, the switching control device closes one of the two switches so as to couple the first terminal of the load to the first supply voltage through the one switch so as to limit the current through the corresponding body diode of the switching device.

21. The device according to claim 19, wherein the protection device comprises a comparator having its first input coupled to the first terminal of the load, its second input coupled to the supply voltage, and its output coupled to an input of the switching control device.

* * * * *